United States Patent [19]

Tonnies

[11] Patent Number: 4,829,635

[45] Date of Patent: May 16, 1989

[54] METHOD OF STUNNING ANIMALS FOR SLAUGHTER

[76] Inventor: Bernd Tonnies, Hoppenstrasse 7, D-4840 Rheda-Wiedenbrück, Fed. Rep. of Germany

[21] Appl. No.: 187,319

[22] Filed: Apr. 28, 1988

[30] Foreign Application Priority Data

May 7, 1987 [DE] Fed. Rep. of Germany ....... 3715211
Mar. 16, 1988 [DE] Fed. Rep. of Germany ....... 3808782

[51] Int. Cl.$^4$ ................................................ A22B 3/00
[52] U.S. Cl. ......................................... 17/45; 17/1 B; 43/125; 128/202.12
[58] Field of Search ...................... 17/1 R, 45, 51, 1 E; 43/125; 128/202.12

[56] References Cited

U.S. PATENT DOCUMENTS 2,588,770  3/1952  Sadler .............................. 43/125 X

*Primary Examiner*—Willie G. Abercrombie
*Attorney, Agent, or Firm*—Charles E. Baxley

[57] ABSTRACT

An animal is stunned before being slaughtered by first being enclosed in a chamber that is then evacuated to an intermediate pressure well below the normal high pressure the animal is used to until the animal loses consciousness but not reflexes. Then the chamber is evacuated again to a low pressure well below the intermediate pressure and this very low pressure is maintained until the animal is without reflexes. The two evacuation steps each take place in less than about 5 sec and together they take about 7 sec. The low pressure is held for about 30 sec. The intermediate pressure can be for a pig about 150 mbar and the low final pressure about 30 mbar.

8 Claims, No Drawings

METHOD OF STUNNING ANIMALS FOR SLAUGHTER

FIELD OF THE INVENTION

The present invention relates to a method of stunning, that is rendering unconscious and without reflexes, an animal prior to slaughtering it. More particularly this invention concerns a procedure for knocking out by means of decompression lunged animals such as pigs, cattle, or fowl prior to slaughtering these animals.

BACKGROUND OF THE INVENTION

U.S. Pat. No. 2,588,770 describes such a method of stunning animals before slaughter. The animals are decompressed either until they are stunned, or until they die. For stunning the pressure in the decompression chamber is dropped in a single step to a predetermined subatmospheric pressure which is maintained until the animal loses consciousness. For killing the pressure is subsequently dropped again in a second step until the animals die from oxygen starvation.

The disadvantage of killing the animals before slaughter is that the animal's circulatory system will not assist at least the initial bleeding of the body. Draining the blood from an animal that is already dead is time consuming so that frequently in the interest of saving time such bleeding is not completed.

Another disadvantage of this method is the animals are subjected to substantial stress during the initial decompression stunning phase. The natural instincts of the animal call up considerable fear with the associated physiological changes, including changes in blood chemistry and cramping, the former can affect the taste of the meat and the latter can further complicate bleeding of the cadaver. Even though the known method is intended to avoid these effects in the animals to be slaughtered by oxygen deprivation, it does not take into effect the physical and even psychological effects created by an uncontrolled decompression. In fact the effect can be as great as the stunning methods employing electric shock or carbon dixide in as far as producing pain, stress, and cramps in the animals.

In addition tests have shown that a one-step drop in the air pressure to stunn the animals is disadvantageous. In itself a sudden pressure drop to a low subatmospheric pressure does serve to effectively stun the animals because the oxygen deprivation is extreme so that all reflexes are lost. Such rapid decompression, however, can actually damage the tissues of the animals. In particular lung hemorrhaging is a possibility as well as damage to other internal tissues. Thus it is normally necessary to slow down the process to avoid such tissue damage, and of course such slowing increases the other stresses the animal is subjected to.

OBJECTS OF THE INVENTION

It is therefore an object of the present invention to provide an improved method of stunning by means of decompression an animal before slaughter.

Another object is the provision of such a method of stunning by means of decompression an animal before slaughter which overcomes the above-given disadvantages, that is which does not subject the animal to physiological or even psychological stress, that is efficient, and that leaves the animal's heart beating.

SUMMARY OF THE INVENTION

According to the preslaughter stunning method of this invention the animal is first enclosed in a chamber that is then evacuated to an intemediate pressure well below the normal high pressure the animal is used to until the animal loses consciousness but not reflexes. Then the chamber is evacuated again to a low pressure well below the intermediate pressure and this very low pressure is maintained until the animal is without reflexes.

The particular advantage of the method of this invention is that it uses a low ending pressure that completely avoids the bad effects discussed above.

According to another feature of this invention the pressure is suddenly increased at the end of the pressure stage to return it to normal ambient pressure. This second pressure shock has a supplementary stunning effect that ensures that the animal is out, although it is still not sufficient to bring about immediate death, that is the animal's heart continues to beat so that bleeding will be profuse and thorough on slaughtering.

According to this invention the two evacuation steps each take place in less than about 5 sec. Together they take about 7 sec. The low pressure is held for about 30 sec. The intermediate pressure can be for a pig about 150 mbar and the low final pressure about 30 mbar.

EXAMPLE

A group of pigs is enclosed in a decompression pressure at an outside normal air pressure of 1030 mbar. The chamber is then evacuated at such a rate that after 3 sec the pressure is only 150 mbar. During this first decompression stage the bodies, in particular the lungs, of the animals are able to decompress slowly enough to avoid hemorrhage. The pigs lose consciousness during this first phase suddenly enough that they undergo no particular stress and even remain capable of reflex reactions.

Subsequently the chamber is evacuated at such a rate that after 4 sec its pressure is only 30 mbar and this pressure is maintained for 30 sec. The pigs lose even reflex reactions during this isocompression phase, but their hearts continue to beat at generally normal rates.

The chamber is then substantially instantaneously recompressed, that is returned to atmospheric pressure. This secondary pressure shock is cumulative to the first one and ensures that the animal will remain without consciousness or reflexes.

The pigs are then slaughtered. The circulatory system which is still active as the animal during the slaughtering allows the animal to be thoroughly bled.

I claim:

1. A method of stunning prior to slaughtering of a lunged animal accustomed to living at a normal relatively high air pressure, the method comprising the steps of sequentially:
    (a) enclosing the animal in an evacuatable chamber;
    (b) rapidly evacuating the chamber to an intemediate pressure well below the normal high pressure until the animal loses consciousness but not reflexes;
    (c) rapidly evacuating the chamber to a low pressure well below the intermediate pressure; and
    (d) holding the chamber at the low pressure until the animal is without reflexes.

2. The method defined in claim 1 wherein steps (b) and (c) each take place in less than about 5 sec.

3. The method defined in claim 2 wherein when the animal is a pig steps (b) and (c) together take about 7 sec.

4. The method defined in claim 3 wherein step (d) takes about 30 sec.

5. The method defined in claim 1, further comprising the step after step (d) of
   (e) recompressing the chamber up to atmospheric pressure.

6. The method defined in claim 5 wherein step (e) is generally instantaneous.

7. The method defined in claim 1 wherein the high pressure is about 1030 mbar, the intermediate pressure is about 150 mbar, and the low pressure about 30 mbar.

8. A method of stunning prior to slaughtering of a pig, the method comprising the steps of sequentially:
   (a) enclosing the pig in an evacuatable chamber at atmospheric pressure;
   (b) evacuating the chamber in about 3 sec to about 150 mbar, whereby the animal loses consciousness but not reflexes;
   (c) evacuating the chamber in about 4 sec to about 30 mbar;
   (d) holding the chamber at 30 mbar until the pig is without reflexes; and
   (e) generally instantaneously recompressing the chamber to atmospheric pressure.

* * * * *